United States Patent
Lim et al.

(10) Patent No.: US 8,397,233 B2
(45) Date of Patent: *Mar. 12, 2013

(54) SYSTEMS AND METHODS FOR PRESERVING THE ORDER OF DATA

(75) Inventors: Raymond Marcelino Manese Lim, Los Altos Hills, CA (US); Stefan Dyckerhoff, Palo Alto, CA (US); Jeffrey Glenn Libby, Cupertino, CA (US); Teshager Tesfaye, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1461 days.

This patent is subject to a terminal disclaimer.

(21) Appl. No.: 11/752,620

(22) Filed: May 23, 2007

(65) Prior Publication Data

US 2007/0220189 A1    Sep. 20, 2007

Related U.S. Application Data

(63) Continuation of application No. 09/967,943, filed on Oct. 2, 2001, now Pat. No. 7,240,347.

(51) Int. Cl.
| | |
|---|---|
| G06F 9/46 | (2006.01) |
| G06F 12/00 | (2006.01) |
| G06F 13/00 | (2006.01) |
| G06F 9/30 | (2006.01) |
| H04L 12/28 | (2006.01) |

(52) U.S. Cl. .......... 718/100; 712/200; 712/201; 710/35; 710/240; 370/392; 370/393

(58) Field of Classification Search .................... 718/100
See application file for complete search history.

(56) References Cited

U.S. PATENT DOCUMENTS

| | | | |
|---|---|---|---|
| 3,614,745 A | 10/1971 | Podvin et al. | |
| 4,594,660 A | 6/1986 | Guenthner et al. | |
| 4,914,653 A | 4/1990 | Bishop et al. | |
| 4,953,159 A | 8/1990 | Hayden et al. | |
| 5,297,255 A | 3/1994 | Hamanaka et al. | |
| 5,325,493 A * | 6/1994 | Herrell et al. ................ | 712/201 |
| 5,592,679 A | 1/1997 | Yung | |
| 6,078,326 A | 6/2000 | Kilmer et al. | |
| 6,138,012 A | 10/2000 | Krutz et al. | |
| 6,195,739 B1 | 2/2001 | Wright et al. | |
| 6,405,267 B1 | 6/2002 | Zhao et al. | |
| 6,430,527 B1 | 8/2002 | Waters et al. | |
| 6,434,145 B1 | 8/2002 | Opsasnick et al. | |
| 6,449,701 B1 | 9/2002 | Cho | |

(Continued)

OTHER PUBLICATIONS

Co-pending U.S. Appl. No. 09/967,943, filed Oct. 2, 2001; entitled: "Systems and Methods for Preserving the Order of Data"; 34 page specification; 10 sheets of drawings.

*Primary Examiner* — Jennifer To

(74) *Attorney, Agent, or Firm* — Harrity & Harrity, LLP

(57) ABSTRACT

A device includes an input processing unit and an output processing unit. The input processing unit dispatches first data to one of a group of processing engines, records an identity of the one processing engine in a location in a first memory, reserves one or more corresponding locations in a second memory, causes the first data to be processed by the one processing engine, and stores the processed first data in one of the locations in the second memory. The output processing unit receives second data, assigns an entry address corresponding to a location in an output memory to the second data, transfers the second data and the entry address to one of a group of second processing engines, causes the second data to be processed by the second processing engine, and stores the processed second data to the location in the output memory.

12 Claims, 10 Drawing Sheets

U.S. PATENT DOCUMENTS

| | | |
|---|---|---|
| 6,453,360 B1 | 9/2002 | Muller et al. |
| 6,532,509 B1 | 3/2003 | Wolrich et al. |
| 6,633,920 B1 | 10/2003 | Bass et al. |
| 6,643,763 B1 | 11/2003 | Starke et al. |
| 6,654,860 B1 | 11/2003 | Strongin et al. |
| 6,658,546 B2 | 12/2003 | Calvignac et al. |
| 6,769,033 B1 | 7/2004 | Bass et al. |
| 6,804,815 B1 | 10/2004 | Kerr et al. |
| 6,904,475 B1 * | 6/2005 | Fairman .......... 710/52 |
| 2002/0078118 A1 | 6/2002 | Cone et al. |

* cited by examiner

SYSTEMS AND METHODS FOR PRESERVING THE ORDER OF DATA

RELATED APPLICATIONS

This application is a continuation of U.S. patent application Ser. No. 09/967,943 filed Oct. 2, 2001 (now U.S. Pat. No. 7,240,347), the entire disclosure of which is incorporated herein by reference.

BACKGROUND OF THE INVENTION

1. Field of the Invention

The principles of the invention relate generally to data flow control, and more particularly, to preserving the order of data.

2. Description of Related Art

Routers receive data on physical media, such as optical fiber, analyze the data to determine its destination, and output the data on a physical medium in accordance with the destination. In some router systems, it is desirable to transmit data in the same order in which the data was received. When router systems include parallel processing, order preservation becomes more difficult to achieve since the parallel processing elements within the router system may not always finish processing in the correct order (i.e., in the order in which data was dispatched to the processing elements).

A conventional approach to solving this problem involves delaying the transfer of processed data from the processing elements until earlier dispatched data has finished processing. This approach, however, unnecessarily restricts the inherent benefits that parallel processing provides.

It is therefore desirable to improve data flow in a network device.

SUMMARY OF THE INVENTION

One aspect consistent with principles of the invention is directed to a method for preserving an order of data processed by a group of processing engines. The method includes dispatching data to at least one of the processing engines, recording an identity of the one processing engine, reserving a corresponding location to the data, processing the data by the one processing engine, and storing the processed data in the location to the data.

A second aspect consistent with principles of the invention is directed to a network device that includes a dispatcher and an arbiter. The dispatcher receives data and dispatches the data to a group of processing elements. The arbiter records an order in which data is dispatched to the processing elements and an identity of the processing element to which the data is dispatched, and reserves a location in a memory for the processed data based on the order.

A third aspect consistent with principles of the invention is directed to a system for preserving an order of data processed by a group of processing engines. The system includes an input interface and an output interface. The input interface receives data via a group of streams, stores the data in a queue associated with the stream via which the data is received, requests a destination address of a memory, and issues the data and destination address to the group of processing engines. The output interface receives the request, assigns the destination address to the data, and stores data from the plurality of processing engines at a location in the memory corresponding to the destination address.

A fourth aspect consistent with principles of the invention is directed to a network device that includes an input processing unit and an output processing unit. The input processing unit dispatches first data to one of a group of processing engines, records an identity of the one processing engine in a location in a first memory, reserves a corresponding location in a second memory, causes the first data to be processed by the one processing engine, and stores the processed first data in the corresponding location in the second memory. The output processing unit receives second data, assigns an entry address corresponding to a location in an output memory to the second data, issues the second data and the entry address to one of a group of second processing engines, causes the second data to be processed by the one second processing engine, and stores the processed second data to the location in the output memory.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents of the claim limitations.

As described herein, an order preservation system is provided in a network device having a group of parallel processing engines. In one implementation consistent with principles of the invention, a system records an identity of the processing engine to which data is dispatched in a first FIFO queue. The system also reserves a corresponding location in a second FIFO queue. When a processing element finishes processing data, it stores the data in the corresponding location in the second FIFO queue. As a result, the order of data flow through the network device is preserved.

In a second implementation consistent with the principles of the invention, a system assigns an entry address corresponding to a location in an output FIFO queue to receive data. The system issues the data and entry address to a group of processing engines. The system then stores the processed data in the location of the output FIFO queue corresponding to the entry address. As a result, the order of data flow through the network device is preserved.

System Configuration

Figure 1:
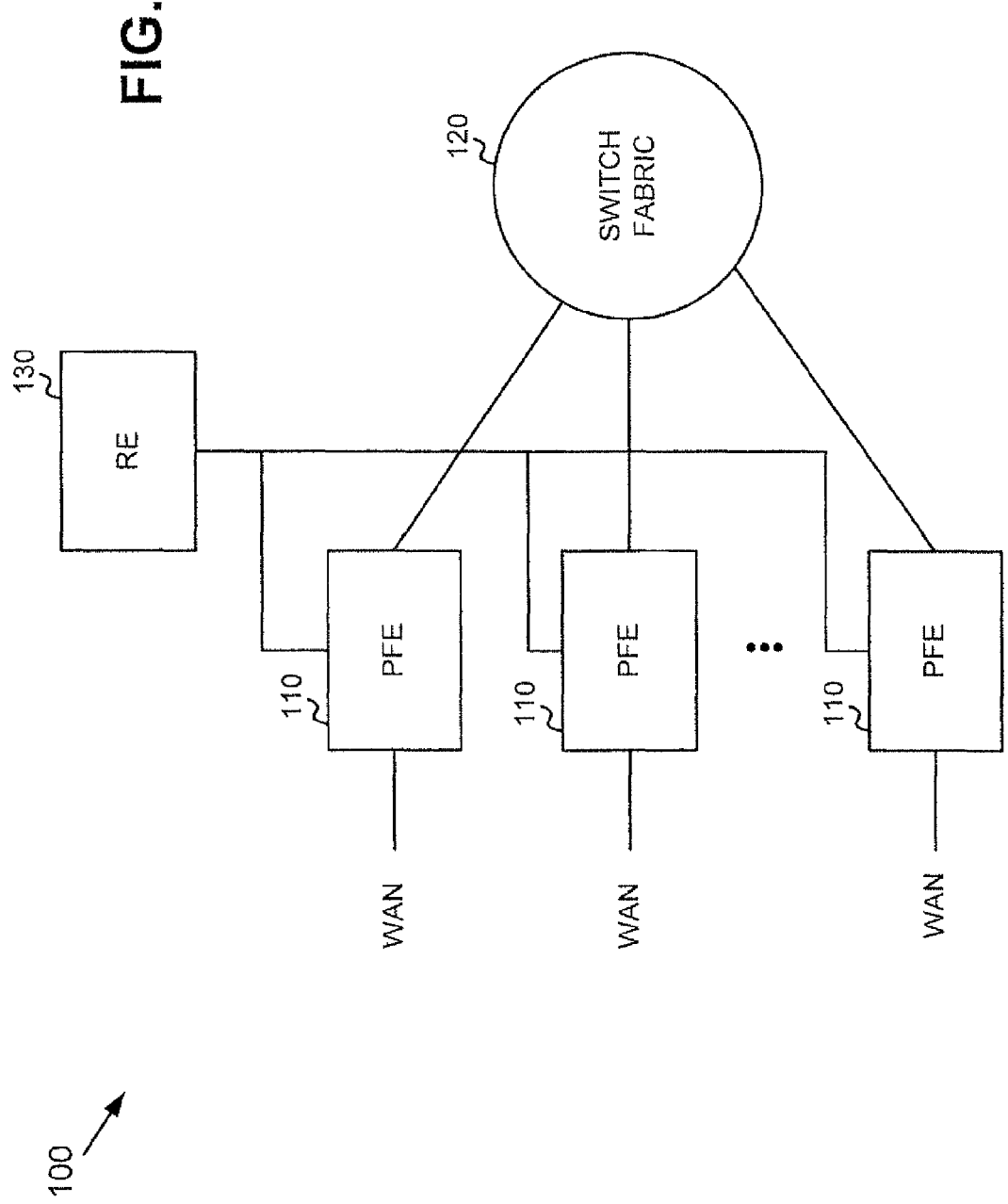
FIG. 1 is a block diagram illustrating an exemplary routing system in which the present invention may be implemented.

FIG. 1 is a block diagram illustrating an exemplary routing system 100 in which the present invention may be implemented. System 100 receives a data stream from a physical link, processes the data stream to determine destination information, and transmits the data stream out on a link in accordance with the destination information. System 100 may include packet forwarding engines (PFEs) 110, a switch fabric 120, and a routing engine (RE) 130.

RE 130 performs high level management functions for system 100. For example, RE 130 communicates with other networks and systems connected to system 100 to exchange information regarding network topology. RE 130 creates routing tables based on network topology information, creates forwarding tables based on the routing tables, and forwards the forwarding tables to PFEs 110. PFEs 110 use the forwarding tables to perform route lookup for incoming packets. RE 130 also performs other general control and monitoring functions for system 100.

PFEs 110 are each connected to RE 130 and switch fabric 120. PFEs 110 receive data at ports on physical links connected to a network, such as a wide area network (WAN). Each physical link could be one of many types of transport media, such as optical fiber or Ethernet cable. The data on the physical link is formatted according to one of several protocols, such as the synchronous optical network (SONET) standard or Ethernet.

PFE 110 processes incoming data by stripping off the data link layer. PFE 110 converts header information from the remaining data into a data structure referred to as a notification. For example, in one embodiment, the data remaining after the data link layer is stripped off is packet data. PFE 110 converts the layer 2 (L2) and layer 3 (L3) packet header information included with the packet data into a notification. PFE 110 may store the notification, some control information regarding the packet, and the packet data in a series of cells. In one embodiment, the notification and the control information are stored in the first two cells of the series of cells.

PFE 110 performs a route lookup using the notification and the forwarding table from RE 130 to determine destination information. PFE 110 may also further process the notification to perform protocol-specific functions, policing, and accounting, and might even modify the notification to form a new notification.

If the destination indicates that the packet should be sent out on a physical link connected to PFE 110, then PFE 110 retrieves the cells for the packet, converts the notification or new notification into header information, forms a packet using the packet data from the cells and the header information, and transmits the packet from the port associated with the physical link.

If the destination indicates that the packet should be sent to another PFE via switch fabric 120, then PFE 110 retrieves the cells for the packet, modifies the first two cells with the new notification and new control information, if necessary, and sends the cells to the other PFE via switch fabric 120. Before transmitting the cells over switch fabric 120, PFE 110 appends a sequence number to each cell, which allows the receiving PFE to reconstruct the order of the transmitted cells. Additionally, the receiving PFE uses the notification to form a packet using the packet data from the cells, and sends the packet out on the port associated with the appropriate physical link of the receiving PFE.

In summary, RE 130, PFEs 110, and switch fabric 120 perform routing based on packet-level processing. PFEs 110 store each packet using cells while performing a route lookup using a notification, which is based on packet header information. A packet might be received on one PFE and go back out to the network on the same PFE, or be sent through switch fabric 120 to be sent out to the network on a different PFE.

Figure 2:
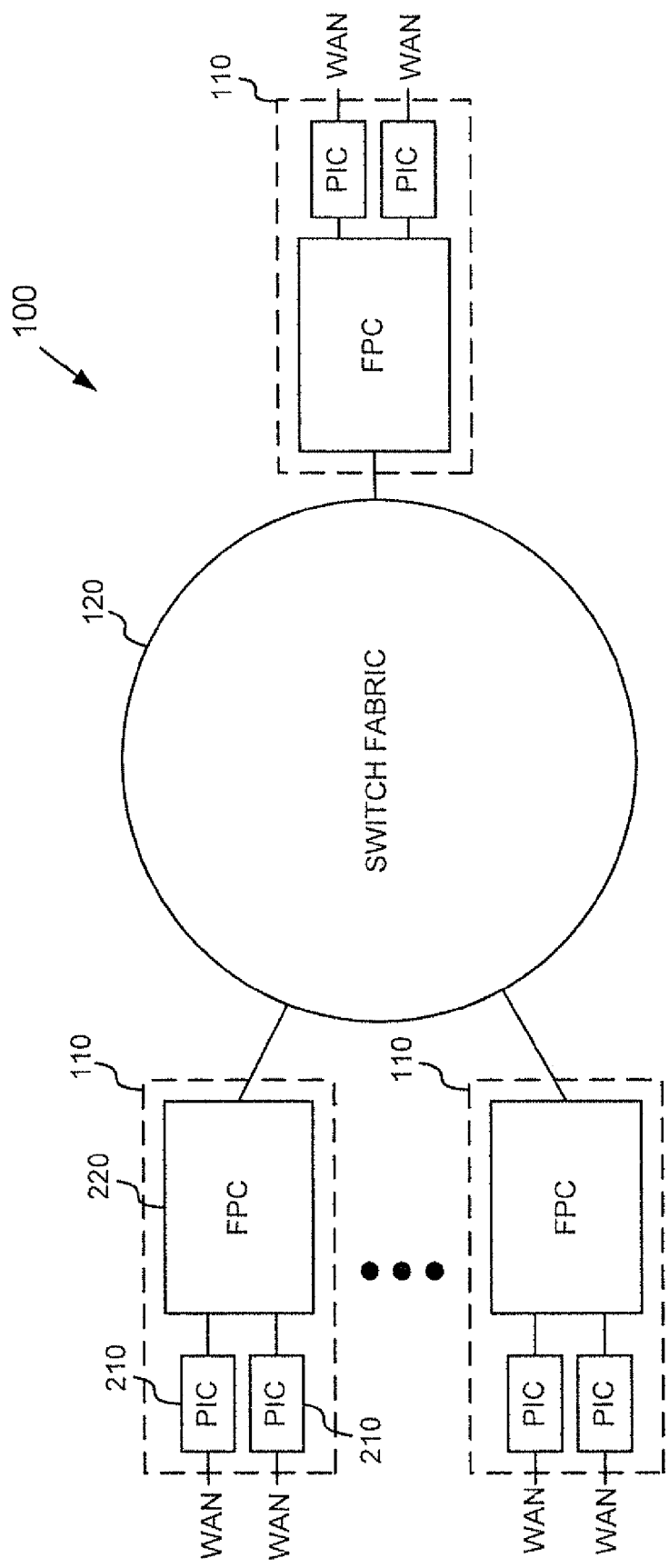
FIG. 2 is an exemplary detailed block diagram illustrating portions of the routing system of FIG. 1.

FIG. 2 is an exemplary detailed block diagram illustrating portions of routing system 100. PFEs 110 connect to one another through switch fabric 120. Each of the PFEs may include one or more physical interface cards (PICs) 210 and flexible port concentrators (FPCs) 220.

PIC 210 transmits data between a WAN physical link and FPC 220. Different PICs are designed to handle different types of WAN physical links. For example, one of PICs 210 may be an interface for an optical link while the other PIC may be an interface for an Ethernet link.

For incoming data, in one embodiment, PICs 210 may strip off the layer 1 (L1) protocol information and forward the remaining data, such as raw packets, to FPC 220. For outgoing data, PICs, 210 may receive packets from FPC 220, encapsulate the packets in L1 protocol information, and transmit the data on the physical WAN link. While two PICs 210 are shown in FIG. 2 as included in a PFE 110, there may be more or fewer PICs in other implementations consistent with the principles of the invention.

FPCs 220 perform routing functions and handle packet transfers to and from PICs 210 and switch fabric 120. For each packet it handles, FPC 220 performs the previously-discussed route lookup function. Although FIG. 2 shows two PICs 210 connected to each of FPCs 220 and three FPCs 220 connected to switch fabric 120, in other embodiments consistent with principles of the invention there can be more or fewer PICs 210 and FPCs 220.

Figure 3:
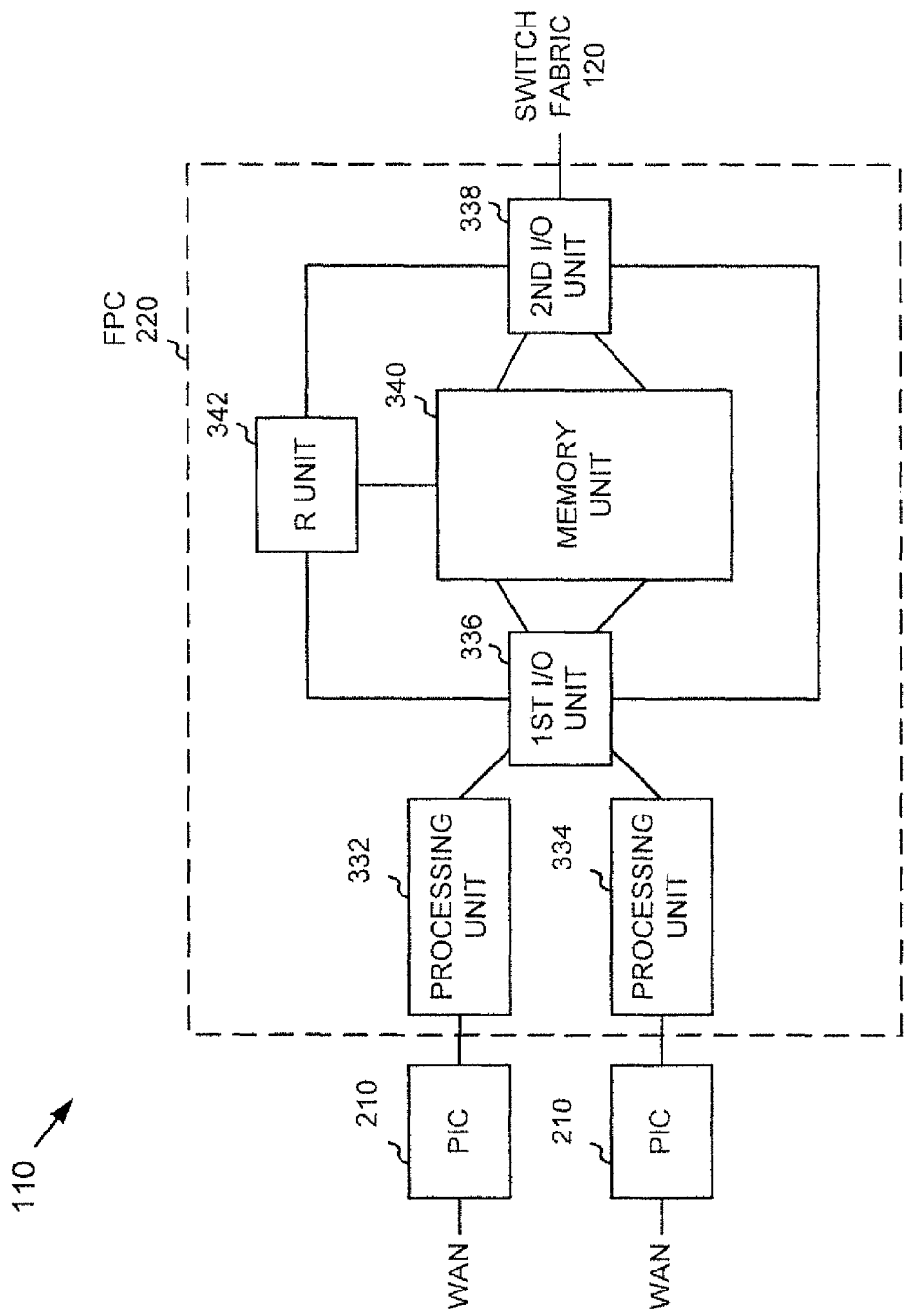
FIG. 3 is an exemplary configuration of a FPC according to an implementation consistent with principles of the invention.

FIG. 3 is an exemplary configuration of FPC 220 according to an implementation consistent with the principles of the invention. FPC 220 may include processing units 332 and 334, first input/output (I/O) unit 336, second input/output (I/O) unit 338, memory unit 340, and R unit 342. Each processing unit 332 and 334 corresponds to one of PICs 210.

As will be described in greater detail below, processing units 332 and 334 may process packet data flowing between PICs 210 and first I/O unit 336. Each processing unit 332 and 334 may operate in two modes: a first mode for processing packet data received from the PIC connected to it, and a second mode for processing data received from first I/O unit 336.

In the first mode, processing unit 332 or 334 may process packets from PIC 210 to convert the packets into data cells, and transmit the data cells to first I/O unit 336. Data cells are the data structure used by FPC 220 internally for transporting and storing data. In one implementation, data cells are 64 bytes in length.

Packets received by processing unit 332 or 334 may include two portions: a header portion and a packet data portion. For each packet, processing unit 332 or 334 may process the header and insert the results of the processing into the data cells. For example, processing unit 332 or 334 might parse L2 and L3 headers of incoming packets and place the results in the data cells. The data stored in the data cells might also include some of the original header information, as well as processed header information. Processing unit 332 or 334 may also create control information based on the packet. The control information may be based on the packet header, the packet data, or both. Processing unit 332 or 334 may then store the processing results, control information, and the packet data in data cells, which it sends to first I/O unit 336.

In the second mode, processing unit 332 or 334 handles data flow in a direction opposite the first mode. In the second mode, processing unit 332 or 334 receives data cells from first I/O unit 336, extracts certain information and packet data from the data cells, and creates a packet based on the extracted information. Processing unit 332 or 334 creates the packet header from the information extracted from the data cells. In one embodiment, processing unit 332 or 334 creates L2 and L3 header information based on the extracted information. Processing unit 332 or 334 may load the packet data portion with the packet data from the data cells.

First I/O unit 336 and second I/O unit 338 coordinate data transfers into and out of FPC 220. Upon receiving data cells, first I/O unit 336 and second I/O unit 338 may extract certain information stored in the data cells, create a key based on the extracted information, and store the key in a notification. The key may contain information later used by R unit 342 to perform a route lookup for data cells received from processing unit 332 or processing unit 334, or encapsulation lookup, for data cells received from another PFE via switch fabric 120.

First I/O unit 336 and second I/O unit 338 may store the data cells in memory unit 340. First I/O unit 336 and second I/O unit 338 may store, in the notification, address information identifying the locations of the data cells in memory unit 340. The address information may be extracted from the notification later and used to read the data cells from memory unit 340. First I/O unit 336 and second I/O unit 338 may send the notification to R unit 342. While first I/O unit 336 and second I/O unit 338 are shown as separate units, they may be implemented as a single unit in other embodiments consistent with the principles of the invention.

R unit 342 may receive notifications from first I/O unit 336 and second I/O unit 338. R unit 342 may provide route lookup, accounting, and policing functionality based on the notifications. R unit 342 may receive one or more forwarding tables from RE 130 (FIG. 1) and use the keys, forwarding table(s), and encapsulation tables to perform route or encapsulation lookups. R unit 342 may insert the lookup result into a notification, which it may store in memory unit 340.

Memory unit 340 may temporarily store data cells from first I/O unit 336 and second I/O unit 338 and notifications from R unit 342. Memory 340 may dispatch the notifications to first I/O unit 336 and second I/O unit 338. In response, first I/O unit 336 and second I/O unit 338 may use the address information in the notification to read out data cells from memory unit 340 that correspond to a notification. The notification received from memory unit 340 may have been previously modified by R unit 342 with route or encapsulation lookup results. First I/O unit 336 and second I/O unit 338 may update the data cells read out of memory unit 340 with information from the modified notification. The data cells, which now include information from the modified notification, are sent to processing unit 332, processing unit 334, or switch fabric 120, depending on which of first I/O unit 336 or second I/O unit 338 is processing the notification.

Exemplary Processing Unit Configuration

Figure 4:
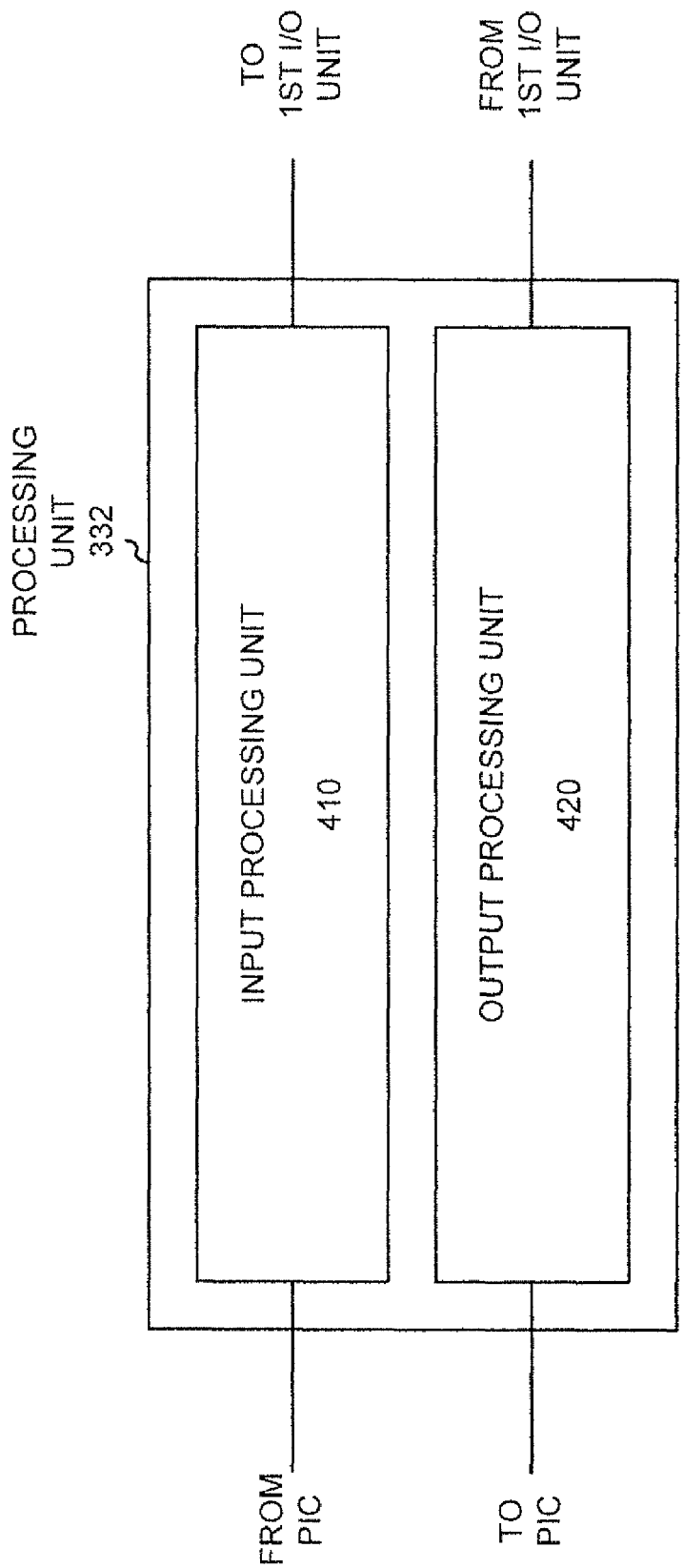
FIG. 4 is an exemplary diagram of a processing unit consistent with the principles of the invention.

FIG. 4 is an exemplary diagram of processing unit 332 consistent with principles of the invention. It will be appreciated that processing unit 334 may be similarly configured. As illustrated, processing unit 332 may include an input processing unit 410 and an output processing unit 420, corresponding to the two modes of operation of the processing unit 332 described above.

As described above, processing unit 332 may operate in a first mode for processing packets received from the PIC connected to it, and a second mode for processing data cells received from first I/O device 336. In the first mode, input processing unit 410 may process packets from PIC 210 to convert the packets into data cells, and transmit the data cells to first I/O unit 336. In the second mode, output processing unit 420 receives data cells from first I/O unit 336, extracts certain fields and packet data from the data cells, and creates a packet based on the extracted information.

A. Exemplary Input Processing Unit Configuration

Figure 5:
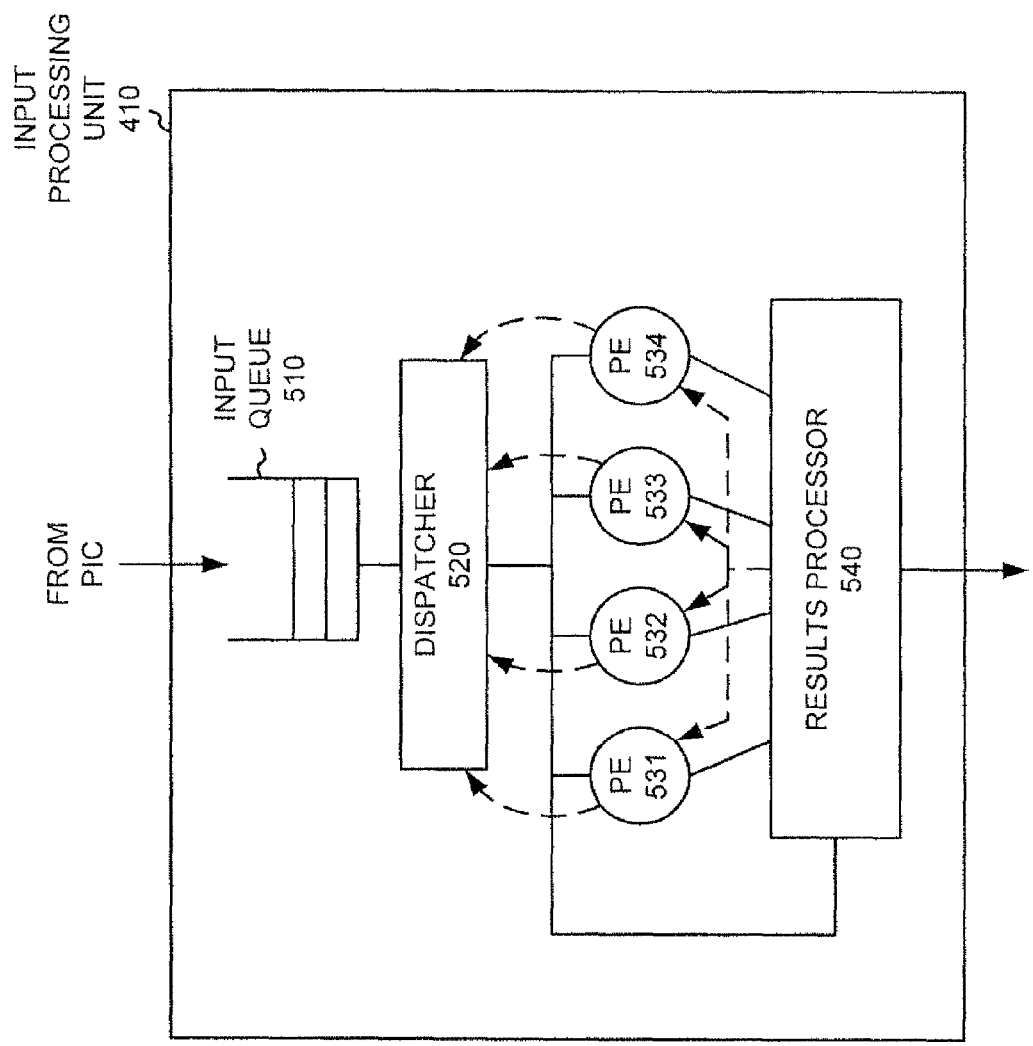
FIG. 5 is an exemplary diagram of an input processing unit in an implementation consistent with principles of the invention.

FIG. 5 is an exemplary diagram of input processing unit 410 in an implementation consistent with principles of the invention. As illustrated, input processing unit 410 includes an input queue 510, a dispatcher 520, a group of processing engines (PEs) 531-534, and a results processor 540. The number of PEs 531-534 illustrated in FIG. 5 is provided for simplicity. In practice, the number of PEs may be larger or smaller than that shown in FIG. 5. Also, it will be appreciated that the input processing unit 410 may include additional devices that aid in the reception, transmission, or processing of data.

Input queue 510 may store packets from the PIC to which processing unit 332 is connected. In one embodiment, input queue 510 may be a first-in, first-out (FIFO) buffer. Dispatcher 520 reads packets from input queue 510 and distributes certain fields of each packet to a respective PE for processing. For example, in one embodiment, the first 128 bytes of a packet (less if the packet is smaller than 128 bytes) are sent to one of PEs 531-534. The fields may include packet header information or other information related to the packet. The fields may be contiguous, noncontiguous, or a combination thereof. Dispatcher 520 tracks the availability of PEs 531-534 via a ready signal from each PE. When a PE is available for processing, it transmits a ready signal to dispatcher 520. Dispatcher 520 may thereafter distribute fields of a packet to the PE for processing.

PEs 531-534 receive packet fields from dispatcher 520 and create control information based on the packet fields. For each packet, each PE 531-534 may, for example, process the header of the packet. For example, processing unit 332 might parse L2 and L3 headers of incoming packets. The resulting control information might include some of the original header information, as well as processed header information. PE 531-534 may also create other control information based on the packet header, the packet data, or both.

Results processor 540 receives control information from PEs 531-534 and places the control information in the order in which the packet fields were distributed to the PEs by dispatcher 520. The control information may become out of order as a result of the PEs processing the packet fields at different speeds. For example, assume that dispatcher 520 sends packet fields from a first packet to PE 531 for processing. Assume that dispatcher 520 thereafter sends packet fields from a second packet to PE 532 for processing. If PE 532 finishes processing the packet fields before PE 531 has finished, the control information created by PEs 531 and 532 may not be received by results processor 540 in the correct order. That is, results processor 540 may receive the control information from PE 532 before receiving the control information from PE 531. Results processor 540 reorders the control information from PEs 531-534, when necessary, to ensure that the control information for each packet is transmitted downstream in the correct order.

Figure 6:
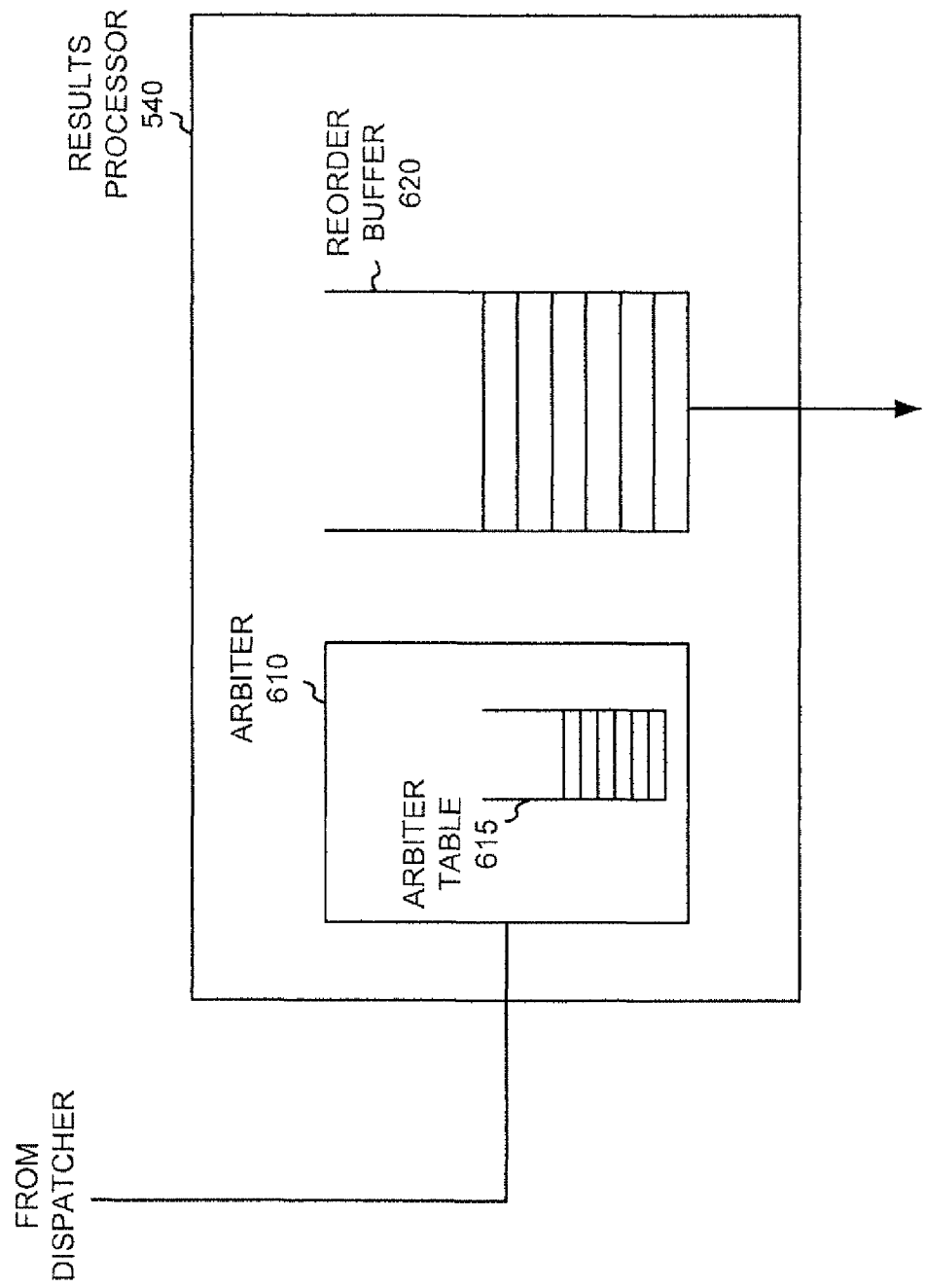
FIG. 6 is an exemplary diagram of a results processor in an implementation consistent with principles of the present invention.

FIG. 6 is an exemplary diagram of results processor 540 in an implementation consistent with principles of the present invention. As illustrated, results processor 540 includes an arbiter 610 and a reorder buffer 620. Arbiter 610 snoops the bus that connects dispatcher 520 and PEs 531-534 to monitor the order in which packet fields are dispatched to PEs 531-534. When dispatcher 520 sends packet fields from a packet to a PE, arbiter 610 stores an identifier of the PE in an arbiter table 615. In one embodiment, arbiter table 615 may be implemented as a FIFO buffer.

Reorder buffer 620 stores control information from PEs 531-534. Reorder buffer 620 may be implemented as a FIFO buffer. When a PE finishes processing, it sends a request to results processor 540 for the assignment of a location within reorder buffer 620. If space is available, reorder buffer 620 may grant the request by sending a memory pointer to the PE corresponding to the location of the PE's identifier in arbiter table 615. As a result, results processor 540 ensures that control information is stored and later transmitted in the correct order.

B. Exemplary Processing of Input Processing Unit

Figure 7:
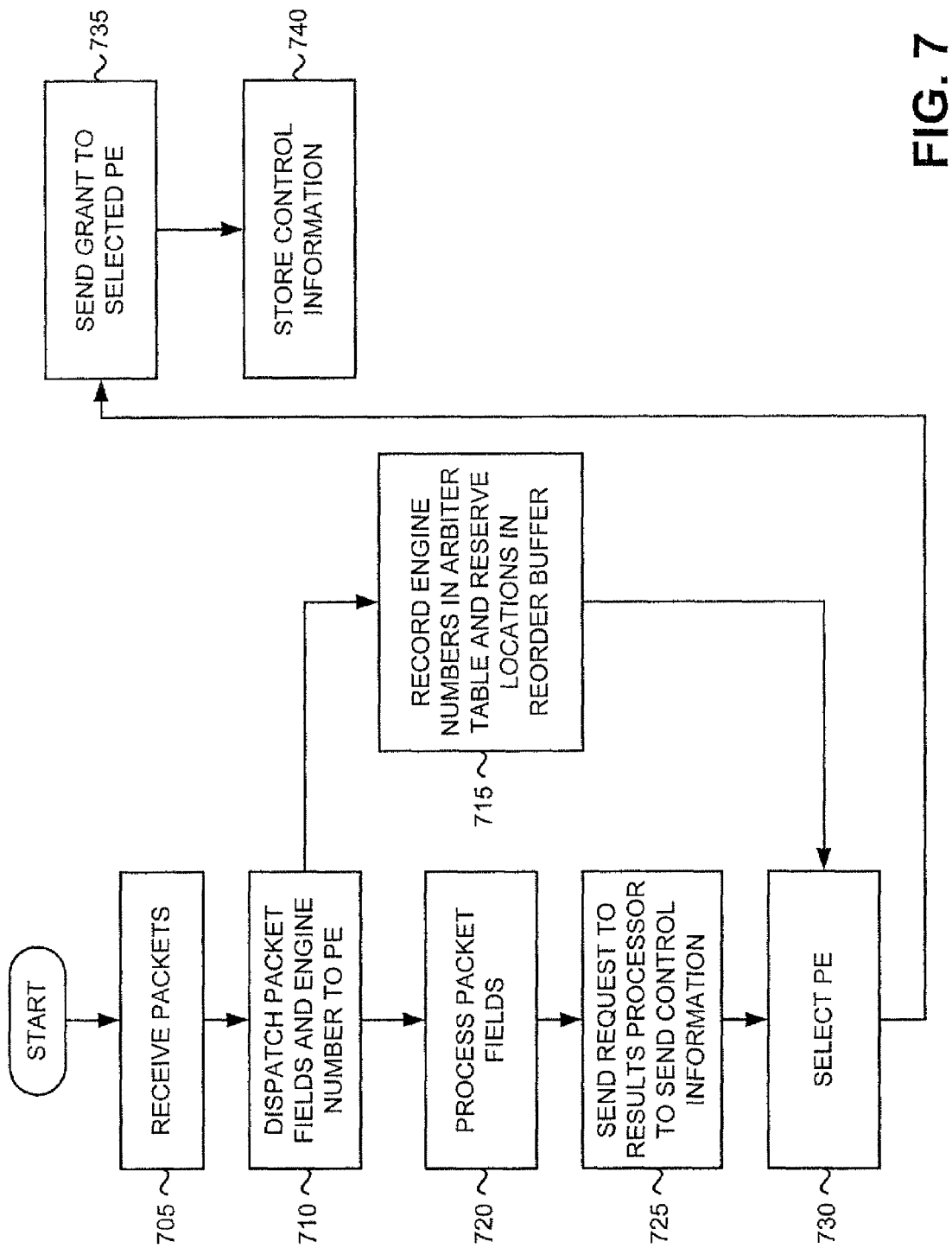
FIG. 7 is a flowchart of an exemplary process for preserving the order of data in an input processing unit.

FIG. 7 is a flowchart of an exemplary process for preserving the order of data in input processing unit 410. Processing may begin with input processing unit 410 receiving packets [act 705]. As illustrated in FIG. 5, input processing unit 410 may receive the packets from PIC 210 and store the packets in input queue 510. Each packet may include a header portion and a packet data portion.

Dispatcher 520 may read the packets from input queue 510 in a first-in, first-out manner. Dispatcher 520 may then determine which PE 531-534 is available to process the fields from the next packet to be processed. To make such a determination, dispatcher 520 may receive a ready signal from available PEs 531-534 and store the ready signal in a register. When fields of a packet are available to be dispatched to PEs 531-534, dispatcher 520 may determine which PEs 531-534 are available by checking the register.

Once an available PE has been determined, dispatcher 520 may send the packet fields to the available PE [act 710]. Dispatcher 520 may also send with the packet fields an engine number that identifies the available PE. As described above, results processor 540 may snoop the bus between dispatcher 520 and PEs 531-534. When dispatcher 520 sends fields for a packet to a PE, results processor 540 records the engine number associated with the packet fields in its arbiter table 615 [act 715].

Results processor 540 stores engine numbers in the order in which the associated packet fields are distributed. For example, assume dispatcher 520 sends packet fields to PEs 531-534 in the following order: PE 531, PE 532, PE 534, PE 533. Results processor 540 stores the engine number associated with PEs 531-534 in arbiter table 615 as illustrated in Table I below.

TABLE I

Exemplary arbiter table configuration

| |
|---|
| PE 533 |
| PE 534 |
| PE 532 |
| PE 531 |

As illustrated, results processor 540 stores the engine numbers identifying PEs 531-534 in the order in which dispatcher 520 transfers packet fields to PEs 531-534. Since, in the example above, dispatcher 520 transferred packet fields to PE 531 first, the engine number identifying PE 531 is stored at the head of arbiter table 615.

When results processor 540 stores an engine number in arbiter table 615, it may also reserve locations in reorder buffer 620 [act 715]. For the example above, results processor 540 would reserve the first location in reorder buffer 620 for PE 531. Since arbiter table 615 and reorder buffer 620 are implemented as FIFO buffers, results processor 540 ensures that the order in which data leaves input processing unit 410 is the same as the order in which it was received.

Once a PE has received packet fields for a packet from dispatcher 520, it may process the packet fields [act 720]. The PE may process the header portion of the packet data to create control information. For example, the PE might parse L2 and L3 headers of incoming packets. The control information might include some of the original header information, as well as processed header information.

Once the PE has finished processing the packet fields for a particular packet, it may transmit a request to results processor 540 for permission to transfer the newly created control information to reorder buffer 620 [act 725]. Results processor 540 may select a PE to transfer its control information [act 730]. Results processor 540 may receive several control information transfer requests simultaneously. Results processor 540 may grant the requests based on the order in which the engine numbers were stored in arbiter table 615 in act 715. Assume, for example, that results processor 540 receives control information transfer requests from PE 531 and 532 at the same time. Results processor 540 would grant the request to PE 531 or 532 that received packet fields from dispatcher 520 first. That is, if dispatcher 520 transferred packet fields to PE 531 before transferring packet fields to PE 532, then results processor 540 would grant the control information transfer request to PE 531 before granting the request to PE 532.

Results processor 540 may transfer a grant signal, along with the engine number that identifies the selected PE, to PEs 531-534 [act 735]. The PE associated with the engine number may then transfer its control information to reorder buffer 620 [act 740]. Results processor 540 stores the control information in a location in reorder buffer 620 corresponding to the position in which the engine number corresponding to the selected PE was stored in arbiter table 615. For example, if the selected PE's engine number is stored at the head of arbiter table 615, results processor 540 stores the control information from that PE at the head of reorder buffer 620. This way, results processor 540 ensures that control information is transferred out of reorder buffer 620 in the same order in which the packet fields from which the control information was created were received by input processing unit 410.

C. Exemplary Output Processing Unit Configuration

Figure 8:
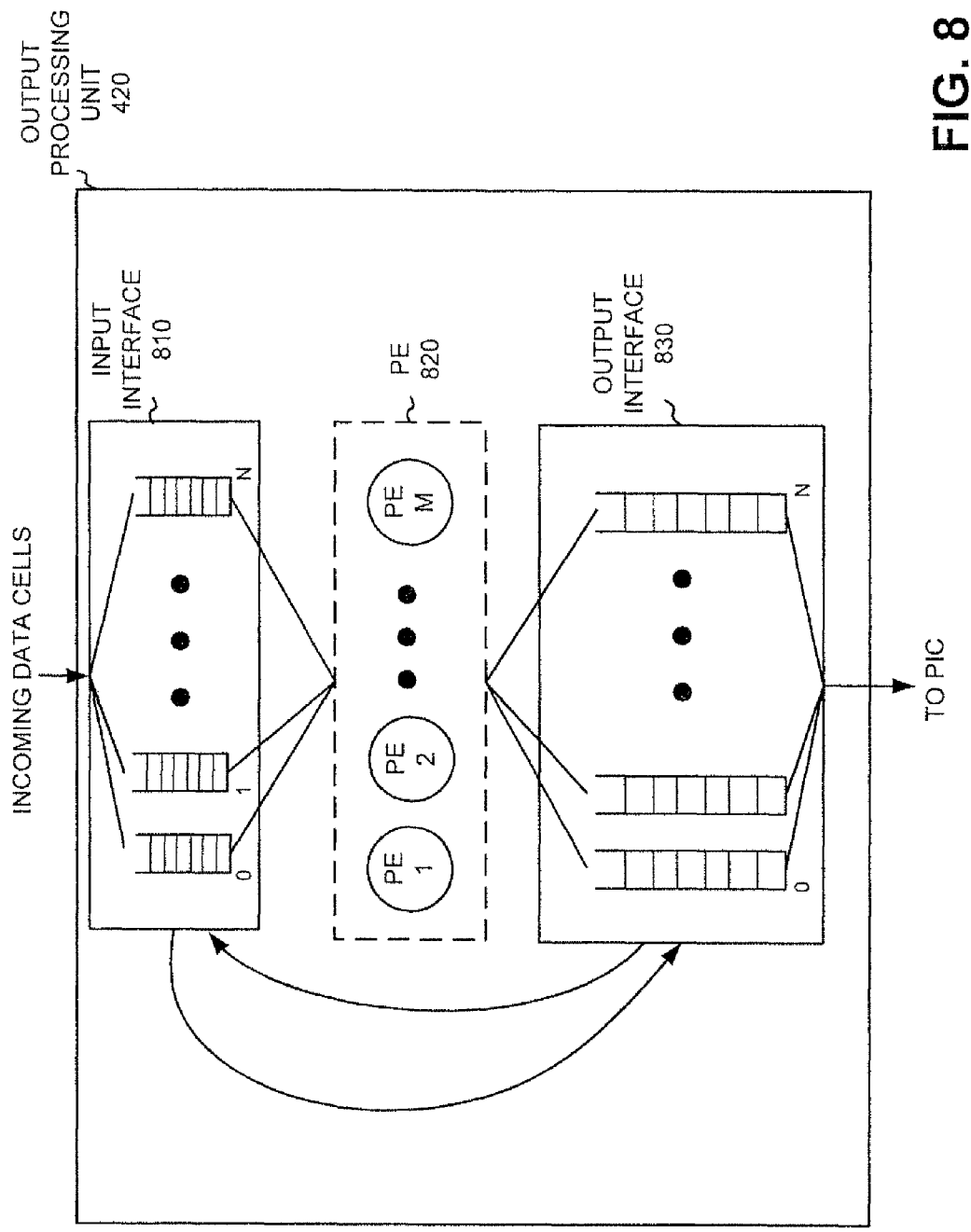
FIG. 8 is an exemplary diagram of an output processing unit in an implementation consistent with principles of the invention.

FIG. 8 is an exemplary diagram of an output processing unit 420 in an implementation consistent with principles of the invention. As illustrated, output processing unit 420 includes an input interface 810, a group of PEs 820, and an output interface 830. It will be appreciated that the output processing unit 420 may include additional devices that aid in the reception, transmission, or processing of data.

Input interface 810 may receive data cells for a packet from first I/O unit 336 via multiple different streams and store the data cells into different input queues, labeled 1-N, respectively, corresponding to the different streams. Input queues 1-N may be implemented as FIFO buffers. In one embodiment, input interface 810 receives data cells from 64 different streams and includes 64 input queues. PEs 820, labeled 1-M, receive a subset of the data cells for a packet from input interface 810, extract control information and packet data from the data cells, and create a packet based on the extracted information. For example, in one embodiment, the first two data cells in the series of data cells carrying a packet may be sent to PEs 820. The first two data cells may contain control information and packet headers. PEs 820 create the packet header based on the received subset of data cells. In one embodiment, PEs 820 create L2 and L3 header information based on information in the cells. PEs 820 may forward the header information to output interface 830.

Output interface 830 may receive the header information from PEs 820, retrieve the remaining data cells for the packet from input interface 810, extract the packet data from the remaining data cells, match the header information with the extracted packet data to form a packet, and store the packet into the appropriate output queue, labeled 1-N, corresponding to the input stream for the packet. In one embodiment, output queues 1-N may be implemented as FIFO buffers.

D. Exemplary Processing of Output Processing Unit

Figure 9A:
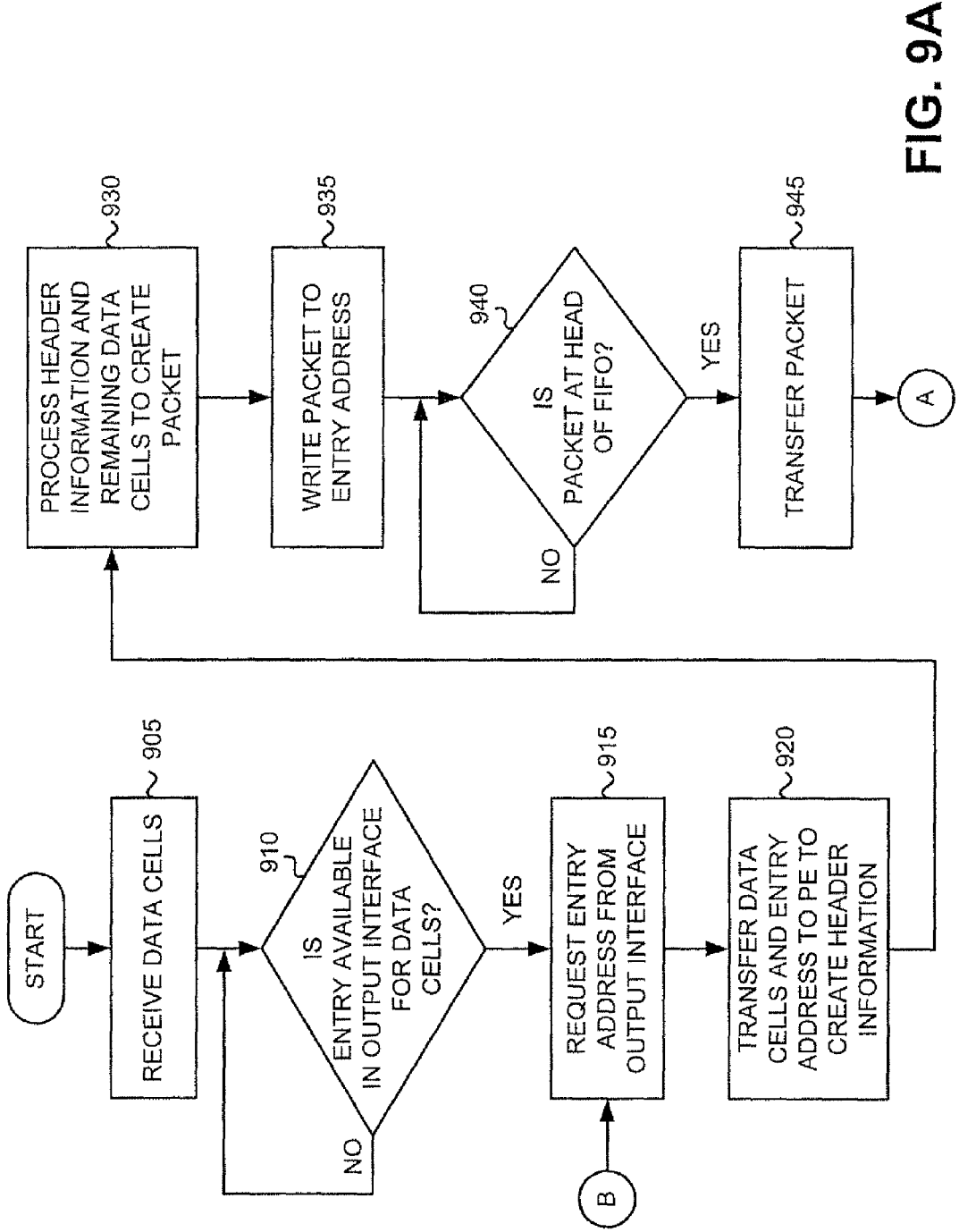
FIGS. 9A and 9B are a flowchart of an exemplary process for preserving the order of data in an output processing unit.
Figure 9B:
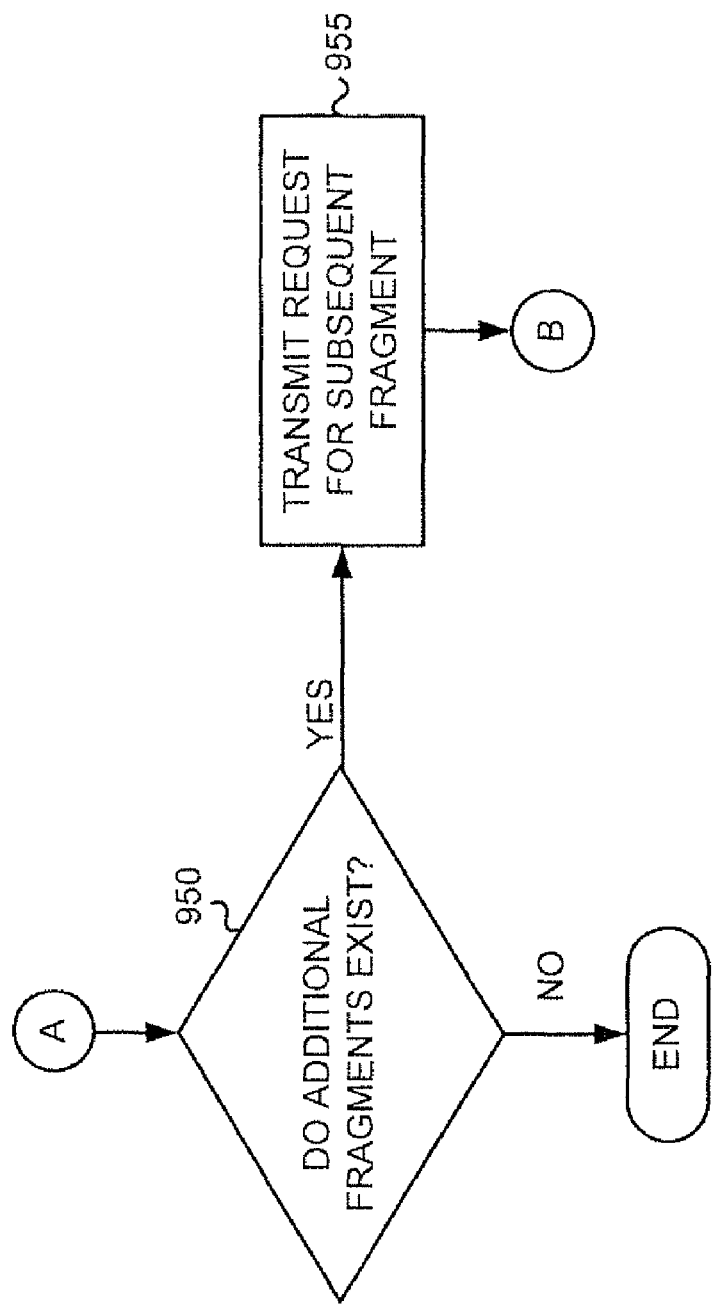

FIGS. 9A and 9B are a flowchart of an exemplary process for preserving the order of data in output processing unit 420. Processing may begin with input interface 810 receiving data cells via one or more different streams [act 905]. Input interface 810 may store the data cells in an input queue corresponding to the particular stream on which the data cell was transmitted.

Once data cells for a packet have been received, input interface 810 may determine whether entries are available in output interface 830 for the data cells [act 910]. As described above, output interface 830 includes an output queue for each stream coming into output processing unit 420. Input interface 810 may determine whether entries are available in the appropriate output queue (i.e., the output queue associated with the stream on which the data cells were received) based on a broadcast signal from output interface 830. In one embodiment, output interface 830 broadcasts the status of the output queues (i.e., whether they have available entries) to input interface 810 every cycle. If no entries are available in the appropriate output queue, input interface 810 holds the data cells in the appropriate input queue until entries become available.

If entries are available in the appropriate output queue, input interface 810 sends a request to output interface 830 for entry addresses [act 915]. The entry addresses identify the locations within the appropriate output queue in which PE 820 will store the packet created from the data cells. Input interface 810 may store the entry addresses with the data cell in the input queue.

Input interface 810 may store and transfer data cells in the input queues in a first-in, first-out manner. When a data cell is at the head of an input queue and an entry is available in an output queue associated with the data stream on which the data cell was received, input interface 810 may transfer the first two data cells for a packet and the entry address to an available PE 820 [act 920].

The PE may process the data cells to create, for example, headers for a packet [act 925]. The PE may extract the control information and other packet data from the data cells, and create packet headers based on the extracted information. In one embodiment, PE 820 creates L2 and L3 header information based on the first two data cells.

Once processing has completed, PE 820 may write the packet header information to the entry address of the appropriate output queue of output interface 830 [act 935]. Output interface 830 then retrieves the remaining data cells for the packet from input interface 810. Output interface 830 extracts the packet data from the data cells, and places the packet data with the header information for the packet from PE 820.

As described above, the output queues of output interface 830 may be implemented as FIFOs. Therefore, when the packet has moved to the head of the output queue [act 940], output interface 830 may transfer the packet from the output queue [act 945]. The above-described processing ensures that packets leave output processing unit 420 in the same order within a stream in which the data cells from which the packets are formed were received.

In some instances, a packet issued by output interface 830 may actually be a packet fragment. Packet fragments may occur when the interface to which the packet is being sent has a smaller packet length handling capability than the interface on which the packet was received. For example, if PIC 210 has a smaller packet length handling capability than processing unit 332, processing unit 332 may have to break a packet up into fragments prior to transmitting to PIC 210.

After a packet is issued from an output queue, output interface 830 may determine whether the packet is a fragment and whether additional fragments exist [act 950] (FIG. 9B). When a packet is a fragment, it may be associated with one or more bits identifying whether additional fragments exist. Output interface 830 may determine whether additional fragments exist by examining this associated bit or bits. If additional fragments exist, output interface 830 may transmit a request to input interface 810 for the next packet fragment [act 955]. Processing may then return to act 915 (FIG. 9A) where input interface 810 requests an entry address for the next fragment from output interface 830.

When an entry address request is for a subsequent packet fragment, output interface 830 assigns the same entry address to each of the subsequent fragments. For example, assume that output interface 830 assigns location Z of output queue I to a first of a group of packet fragments. Output interface 830 would assign subsequent packet fragments of this group to the same location in output queue I (i.e., location Z). Processing may then continue with act 920.

If output interface 830 determines in act 950 that the packet is not a fragment or is the last of a group of packet fragments, then processing with respect to that packet or packet fragment group may end. It will be appreciated, however, that output processing unit 420 may continue processing additional packets in the manner described above.

As an example of the above processing, assume that input interface 810 receives data cells A, B, and C from a single stream in the following order A, B, C. Assume farther that data cell A consists of data cell fragments A0, A1, and A2. Input interface 810 may request entry addresses for data cells A0 (the first of the group of fragments), B, and C. Assume that output interface 830 assigns location Z of an output queue (the head of the output queue) to data cell A0, location Y to data cell B, and location X to data cell C, as illustrated in Table II below. Once an entry address has been assigned to a data cell, input interface 810 may transfer the data cell to PE 820.

TABLE II

| Exemplary Output Queue Assignments |
| --- |
| Location X |
| Location Y |
| Location Z |

Assume that input interface 810 transfers data cells A0, B, and C to PEs 1-3, respectively, in PE 820 and that the PEs finish processing in the following order: PE 3, PE 1, PE 2. PEs 1-3 may write the newly formed packets to the output queue in their assigned locations. Tables III-V illustrate the status of the output queue as PEs 1-3 finish processing.

TABLE III

Exemplary Output Queue Configuration after PE 3 Finishes Processing

Packet C
Empty
Empty

TABLE IV

Exemplary Output Queue Configuration after PEs 3 and 1 Finish Processing

Packet C
Empty
Packet Fragment A0

TABLE V

Exemplary Output Queue Configuration after PEs 3, 1, 2 Finish Processing

Packet C
Packet B
Packet Fragment A0

Once the head of the output queue (i.e., location Z) contains a packet, output interface 830 may transfer the packet. Assume that output interface 830 transfers packet fragment A0. The output queue may then be configured as illustrated in Table VI. Output interface 830 may determine that additional fragments exist by examining a bit associated with packet fragment A0 and may send a request to input interface 810 for the next fragment. In response, input interface 810 may request an entry address for fragment A1. In an embodiment consistent with the principles of the invention, output interface 830 assigns location Z to fragment A1 and sending an indication of such to input interface 810.

TABLE VI

Exemplary Output Queue Configuration after A0 is Transferred

Packet C
Packet B
Empty

Input interface 810 may then transfer fragment A1 to a PE in PE 820, along with the entry address Z. Once the PE has completed processing the fragment, the PE may write the packet fragment A1 to location Z of the output queue, as illustrated in Table VII.

TABLE VII

Exemplary Output Queue Configuration after PE Processes Fragment A1

Packet C
Packet B
Packet Fragment A1

Output interface 830 may transfer packet fragment A1 and the above-described processing may be repeated for fragment A2. Once output interface 830 transfers packet fragment A2, output interface 830 may determine that no other fragments exist by examining the bit associated with fragment A2. Output interface 830 may move the current pointer for the output queue to location Y and may then transfer packet B. Similarly, after packet B has been transferred, output interface 830 may move the current pointer for the output queue to location X and may then transfer packet C. The above-described processing ensures that packets are transmitted in the order in which they are received.

The foregoing description of preferred embodiments of the principles of the invention provides illustration and description, but is not intended to be exhaustive or to limit the invention to the precise form disclosed. Modifications and variations are possible in light of the above teachings or may be acquired from practice of the invention. For example, while series of acts have been described in FIGS. 7, 9A, and 9B, the order of the acts may vary in other implementations consistent with the principles of the invention. In addition, non-dependent acts may be performed in parallel. No element, act, or instruction used in the description of the principles of the application should be construed as critical or essential to the invention unless explicitly described as such.

The scope of the invention is defined by the claims and their equivalents.

What is claimed is:

1. A method comprising:
   outputting data to one processor of a plurality of processors;
   recording an identity of the one processor in a first location in a first memory, the first memory including a list of processors, identities of the processors, in the list of processors, being ordered based on an order in which the processors receive data;
   reserving, based on the first location, a second location for the data in a second memory;
   processing the data by the one processor;
   receiving requests from multiple processors, of the plurality of processors, to store processed data, the requests including a request, from the one processor, to store the data processed by the one processor;
   granting the request from the one processor based on an order of identities of the multiple processors in the list of processors; and
   storing the data processed by the one processor in the second location.

2. The method of claim 1, where the outputting includes:
   outputting the data in a first-in, first-out manner.

3. A system comprising:
   a first processor to output data;
   a plurality of second processors to:
       receive the data from the first processor,
       process the data, each second processor being associated with an identity, and
       send a request to a third processor, after processing the data, to store the processed data in a second memory;
   a first memory;
   the second memory; and
   the third processor to:
       record, for each received data and at a location in the first memory, an identity of a second processor, of the plurality of second processors, at which the data is received, the first memory including a list of identities of the second processors ordered based on when data is received at each second processor,
       reserve, for data received at the second processor, a corresponding location in the second memory for storing the processed data, the location in the second memory corresponding to a location in the first memory where the identity of the second processor is stored, receive, from two or more second processors of the plurality of second processors, requests to store processed data, and grant the requests to store the processed data based on an order in which identities of the two or more second processors are stored in the list of identities.

4. The system of claim 3, where the first processor is further to:

identify an available second processor, and output data and an identity of the available second processor to the available third processor.

5. The system of claim 4, further comprising:

a bus to interconnect the first processor and the plurality of second processors, and where the third processor is to:

obtain, from the bus, the identity of the available second processor.

6. A method comprising:

receiving a plurality of packets;

outputting a first packet, of the plurality of packets, to a first processor;

recording an identity of the first processor in a first location in a memory;

reserving a second location for the first packet in the memory, the second location being based on the first location;

outputting a second packet, of the plurality of packets, to a second processor;

recording an identity of the second processor in a third location in the memory, the identity of the second processor being ordered after the identity of the first processor in a list of identities of processors stored in the memory;

reserving a fourth location for the second packet in the memory, the fourth location being based on the third location;

processing the first and second packets by the first and second processors;

receiving, from multiple processors, requests to store processed packets, the requests including a request from the first processor to store the processed first packet and a request from the second processor to store the processed second packet;

storing, based on the request from the first processor, the processed first packet in the second location; and storing, based on the request from the second processor, the processed second packet in the fourth location.

7. The method of claim 6, where outputting the first packet and outputting the second packet include:

outputting the first and second packets in a first-in, first-out manner.

8. The method of claim 6, where processing the first and second packets includes processing headers of the first and second packets.

9. The method of claim 6, where processing the first and second packets includes processing the first and second packets in parallel.

10. The method of claim 6, where receiving a plurality of packets includes receiving the plurality of packets via a stream of a plurality of streams.

11. The method of claim 6, where receiving the plurality of packets includes storing the received plurality of packets in an input queue.

12. The method of claim 6, where outputting the first packet to the first processor includes:

receiving a ready signal from the first processor, and outputting the first packet to the first processor after receiving the ready signal.

* * * * *